(12) United States Patent
Chavrier et al.

(10) Patent No.: US 12,741,526 B2
(45) Date of Patent: Sep. 22, 2026

(54) METHOD FOR OPERATING A VEHICLE AND VEHICLE OPERATED BY SUCH A METHOD

(71) Applicant: Volvo Truck Corporation, Gothenburg (SE)

(72) Inventors: Philemon Chavrier, Lyons (FR); Olivier Poussin, Lyons (FR); Cedric Mazaufroy, Miribel (FR); Sebastien Pesenti, Saint Priest (FR)

(73) Assignee: Volvo Truck Corporation, Gothenburg (SE)

( * ) Notice: Subject to any disclaimer, the term of this patent is extended or adjusted under 35 U.S.C. 154(b) by 305 days.

(21) Appl. No.: 18/582,822

(22) Filed: Feb. 21, 2024

(65) Prior Publication Data

US 2024/0286481 A1 Aug. 29, 2024

(30) Foreign Application Priority Data

Feb. 28, 2023 (EP) .................................... 23159209

(51) Int. Cl.
*B60K 6/10* (2006.01)

(52) U.S. Cl.
CPC ......... *B60K 6/105* (2013.01); *B60Y 2400/162* (2013.01)

(58) Field of Classification Search
CPC ....................... B60K 2006/4808; B60K 6/105; B60K 6/387; B60K 6/48; B60K 8/00;
(Continued)

(56) References Cited

U.S. PATENT DOCUMENTS 4,171,029 A * 10/1979 Beale ...................... F02D 29/02 180/54.1
4,252,208 A * 2/1981 Heidemeyer .......... B60K 6/105 192/48.8

(Continued)

FOREIGN PATENT DOCUMENTS

CN 202593289 U * 12/2012
CN 103158545 A * 6/2013

(Continued)

OTHER PUBLICATIONS

WO-2013175165-A1 English Translation (Year: 2013).*

(Continued)

*Primary Examiner* — Michael T. Walsh
(74) *Attorney, Agent, or Firm* — Sage Patent Group

(57) ABSTRACT

A vehicle comprises an internal combustion engine, a wheel propulsion shaft, wheels and a kinetic energy recovery system configured to recover and store kinetic energy of the vehicle, and restore the stored energy by propelling the wheel propulsion shaft and/or by cranking the internal combustion engine. To reduce the emissions of the vehicle, a method for operating the vehicle comprises, when the vehicle operates: when the vehicle is not stationary, recovering and storing kinetic energy of the vehicle in the KERS, when the vehicle is stationary, measuring an energy level stored in the KERS and comparing the measured energy level to a predetermined high threshold value, so that the method comprises, if the energy level stored in the KERS is above the predetermined high threshold value: stopping the internal combustion engine, then when the vehicle start is required, propelling the wheel propulsion shaft exclusively by the KERS.

18 Claims, 2 Drawing Sheets

(58) Field of Classification Search

CPC ...... B60W 10/02; B60W 10/04; B60W 10/06; B60W 10/08; B60W 10/113; B60W 10/24; B60W 20/10; B60W 20/14; B60W 20/19; B60W 20/40; B60W 2300/125; B60W 2510/02; B60W 2510/0208; B60W 2510/24; B60W 2510/244; B60W 2520/04; B60W 2520/10; B60W 2710/00; B60W 2710/02; B60W 2710/021; B60W 2710/24; B60W 30/18; B60W 30/18009; B60W 30/18127; B60W 30/18181; B60W 30/1819; B60W 30/188; B60W 50/04; B60W 50/082; B60W 50/085; B60Y 2400/162; F03G 7/0252; Y02T 10/62

See application file for complete search history.

(56) References Cited

U.S. PATENT DOCUMENTS

| | | | | |
|---|---|---|---|---|
| 4,411,171 | A * | 10/1983 | Fiala | B60K 6/30 903/910 |
| 9,102,223 | B2 * | 8/2015 | Greenwood | B60K 6/105 |
| 10,882,512 | B2 * | 1/2021 | Kobler | B60K 6/547 |
| 11,167,748 | B2 * | 11/2021 | Friedrich | B60W 20/00 |
| 2006/0108954 | A1 | 5/2006 | Sebille et al. | |
| 2014/0158441 | A1 | 6/2014 | Ono et al. | |
| 2019/0161069 | A1 | 5/2019 | Yui | |

FOREIGN PATENT DOCUMENTS

| | | | | |
|---|---|---|---|---|
| CN | 105073468 | A * | 11/2015 | B60W 10/06 |
| CN | 112046293 | A * | 12/2020 | B60L 15/20 |
| DE | 102012018730 | A1 | 3/2014 | |
| DE | 112012003475 | T5 | 4/2014 | |
| GB | 2464257 | A * | 4/2010 | B60W 30/18127 |
| WO | WO-2013175165 | A1 * | 11/2013 | B60K 6/445 |
| WO | 2018102428 | A1 | 6/2018 | |
| WO | 2020008095 | A1 | 1/2020 | |

OTHER PUBLICATIONS

GB-2464257-A English Translation (Year: 2010).*

CN-103158545-A English Translation (Year: 2013).*

CN-105073468-A English Translation (Year: 2015).*

CN-112046293-A English Translation (Year: 2020).*

CN-202593289-U English Translation (Year: 2012).*

European Search Report for European Patent Application No. 23159209.8, dated Jul. 3, 2023.

* cited by examiner

METHOD FOR OPERATING A VEHICLE AND VEHICLE OPERATED BY SUCH A METHOD

CROSS REFERENCE TO RELATED APPLICATION

This application claims priority to European Patent Application Number 23159209.8, filed on Feb. 28, 2023, the disclosure and content of which is incorporated by reference herein in its entirety.

TECHNICAL FIELD

The disclosure relates generally to vehicles driven by an internal combustion engine. In particular aspects, the disclosure relates to a method for operating a vehicle and vehicle operated by such a method. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

It is known to provide vehicles propelled by an internal combustion engine with a start-stop system, also known as a stop-and-go system. Such system automatically shuts down and restarts the internal combustion engine when the vehicle is stopped, to reduce the amount of time the engine spends idling, thus reducing fuel consumptions and emissions of pollutants and noise. A start-stop system usually rely on the vehicle starter to start the internal combustion engine.

It is also known, in hybrid cars comprising an internal combustion engine and an electric motor, the electric motor is used to recover mechanical energy from the vehicle and convert it into electrical energy, for example through regenerative braking. This electrical energy is then used to propel the vehicle, thereby reducing its fuel consumption.

However, such systems are complex and expensive to implement in heavy-duty vehicles, and there is a need for more efficient vehicles with reduced noise and pollutants emissions and reduced fuel consumption.

SUMMARY

According to a first aspect of the disclosure, the disclosure relates to a method for operating a vehicle, the vehicle comprising an internal combustion engine, a wheel propulsion shaft, configured to be driven by the internal combustion engine, wheels, configured to be driven by the wheel propulsion shaft, and a kinetic energy recovery system KERS), connected to the internal combustion engine and to the wheel propulsion shaft and configured to recover and store kinetic energy of the vehicle as mechanical energy, and restore the stored energy by propelling the wheel propulsion shaft and/or by cranking the internal combustion engine. The method comprises, when the vehicle operates:

when the vehicle is not stationary, recovering and storing kinetic energy of the vehicle in the kinetic energy recovery system as mechanical energy, when the vehicle is stationary, measuring an energy level stored in the kinetic energy recovery system and comparing the measured energy level stored in the kinetic energy recovery system to a predetermined high threshold value, so that the method comprises, if the energy level stored in the kinetic energy recovery system is above the predetermined high threshold value:

stopping the internal combustion engine, then when the vehicle start is required, propelling the wheel propulsion shaft exclusively by the kinetic energy recovery system.

The first aspect of the disclosure may seek to reduce the noise and pollutants emissions of the vehicle. A technical benefit may include reducing the use of the engine by propelling the vehicle exclusively with the kinetic energy recovery system.

In some examples, including in at least one preferred example, optionally, after propelling the wheel propulsion shaft exclusively with the kinetic energy recovery system, the method comprises propelling the wheel propulsion shaft with the internal combustion engine when the speed of the vehicle is above a predetermined speed threshold, preferably above km/h, more preferably above 15 km/h, most preferably above 30 km/h. A technical benefit may include cranking the engine only after the vehicle reached an important speed, thus avoiding using the engine during the initial acceleration of the vehicle.

In some examples, including in at least one preferred example, optionally the vehicle further comprises an upstream clutch operable between an uncoupling configuration, in which the kinetic energy recovery system is not connected to the internal combustion engine, and a coupling configuration, in which the kinetic energy recovery system is connected to the internal combustion engine, and, before propelling the wheel propulsion shaft exclusively with the kinetic energy recovery system, the method further comprises operating the upstream clutch in the uncoupling configuration. A technical benefit may include improving the efficiency of the vehicle, since the kinetic energy recovery system does not have to drive the engine when propelling the vehicle.

In some examples, including in at least one preferred example, optionally the method further comprises, if the energy level stored in the kinetic energy recovery system is below the predetermined high threshold value:

when the vehicle is stationary, comparing the measured energy level stored in the kinetic energy recovery system to a predetermined medium threshold value, the predetermined medium threshold value being lower than the predetermined high threshold value, so that the method comprises, if the energy level stored in the kinetic energy recovery system is above the predetermined medium threshold value:

stopping the internal combustion engine, then when the vehicle start is required, cranking the internal combustion engine, and propelling the wheel propulsion shaft with the kinetic energy recovery system and with the internal combustion engine.

A technical benefit may include reducing the load onto the engine, thus reducing noise and pollutants emissions, and using more appropriately the kinetic energy stored in the kinetic energy recovery system.

In some examples, including in at least one preferred example, optionally when the energy level stored in the kinetic energy recovery system is above the predetermined medium threshold value and below the predetermined high threshold value and when the vehicle start is required, the internal combustion engine is cranked by the kinetic energy recovery system. A technical benefit may include avoiding the use of a starter to crank the engine.

In some examples, including in at least one preferred example, optionally the vehicle further comprises a downstream clutch operable between an uncoupling configuration, in which the kinetic energy recovery system is not connected to the wheel propulsion shaft, and a coupling configuration, in which the kinetic energy recovery system is connected to the wheel propulsion shaft, and the method further comprises, if the energy level stored in the kinetic energy recovery system is below the predetermined high threshold value and, if applicable, below the predetermined medium threshold value:

when the vehicle is stationary, comparing the measured energy level stored in the kinetic energy recovery system to a predetermined low threshold value, the predetermined low threshold value being lower than the predetermined high threshold value and, if applicable, lower than the predetermined medium threshold value, so that the method comprises, if the energy level stored in the kinetic energy recovery system is above the predetermined low threshold value:

stopping the internal combustion engine and operating the downstream clutch in the uncoupling configuration, then when the vehicle start is required, cranking the internal combustion engine with the kinetic energy recovery system, operating the downstream clutch in the coupling configuration and propelling the wheel propulsion shaft with the internal combustion engine.

A technical benefit may include avoiding the use of a starter to crank the engine and using more appropriately the kinetic energy stored in the kinetic energy recovery system.

In some examples, including in at least one preferred example, optionally the method further comprises, if the energy level stored in the kinetic energy recovery system is below the predetermined high threshold value, if applicable, below the predetermined medium threshold value, and, if applicable, below the predetermined low threshold value: when the vehicle is stationary, keeping the internal combustion engine running, then when the vehicle start is required, propelling the wheel propulsion shaft with the internal combustion engine. A technical benefit may include avoiding an engine stop when the energy level stored in the kinetic energy storage system is too low to crank the engine.

In some examples, including in at least one preferred example, optionally the vehicle further comprises a starter, configured to crank the internal combustion engine, and the method further comprises, if the energy level stored in the kinetic energy recovery system is below the predetermined high threshold value, if applicable, below the predetermined medium threshold value, and, if applicable, below the predetermined low threshold value: when the vehicle is stationary, stopping the internal combustion engine, then when the vehicle start is required, cranking the internal combustion engine with the starter and propelling the wheel propulsion shaft with the internal combustion engine. A technical benefit may include allowing to stop the engine when the vehicle is stationary even if the energy level stored in the kinetic energy storage system is too low to crank the engine.

According to a second aspect of the disclosure, the disclosure relates to a control unit configured to perform the method described here above. A technical benefit may include being able to provide a control unit capable of improving the operation of a vehicle.

According to a third aspect of the disclosure, the disclosure relates to a vehicle comprising an internal combustion engine, a wheel propulsion shaft, configured to be driven by the internal combustion engine, wheels, configured to be driven by the wheel propulsion shaft, a kinetic energy recovery system, connected to the internal combustion engine and to the wheel propulsion shaft and configured to: recover and store kinetic energy of the vehicle as mechanical energy, and restore the stored energy by propelling the wheel propulsion shaft and/or by cranking the internal combustion engine, and a control unit. Furthermore, the control unit is according to the control unit described here above. The second aspect of the disclosure may seek to reduce the noise and pollutants emissions of the vehicle. A technical benefit May include reducing the use of the engine by propelling the vehicle exclusively with the kinetic energy recovery system.

In some examples, including in at least one preferred example, optionally the vehicle further comprises an upstream clutch operable between an uncoupling configuration, in which the kinetic energy recovery system is not connected to the internal combustion engine, and a coupling configuration, in which the kinetic energy recovery system is connected to the internal combustion engine. A technical benefit may include operating the upstream clutch in the uncoupling configuration to avoid losing energy by propelling the engine with the kinetic energy recovery system when the vehicle is propelled only by the kinetic energy recovery system.

In some examples, including in at least one preferred example, optionally the vehicle further comprises a downstream clutch operable between an uncoupling configuration, in which the kinetic energy recovery system is not connected to the wheel propulsion shaft, and a coupling configuration, in which the kinetic energy recovery system is connected to the wheel propulsion shaft. A technical benefit may include allowing to crank the engine with the kinetic energy recovering system without propelling the vehicle, by operating the downstream clutch in the uncoupling configuration.

In some examples, including in at least one preferred example, optionally the vehicle further comprises a starter, configured to crank the internal combustion engine. A technical benefit may include allowing to crank the engine when the energy level stored into the kinetic energy recovering system is too low to crank the engine.

In some examples, including in at least one preferred example, optionally the kinetic energy recovery system comprises a flywheel. A technical benefit may include efficiently recovering kinetic energy of the vehicle.

In some examples, including in at least one preferred example, optionally the vehicle is a heavy-duty vehicle, preferably a truck. A technical benefit may include reducing the noise and pollutants emissions of heavy-duty vehicles, which are generally heavily regulated, in particular in urban environments.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

Figure 1:
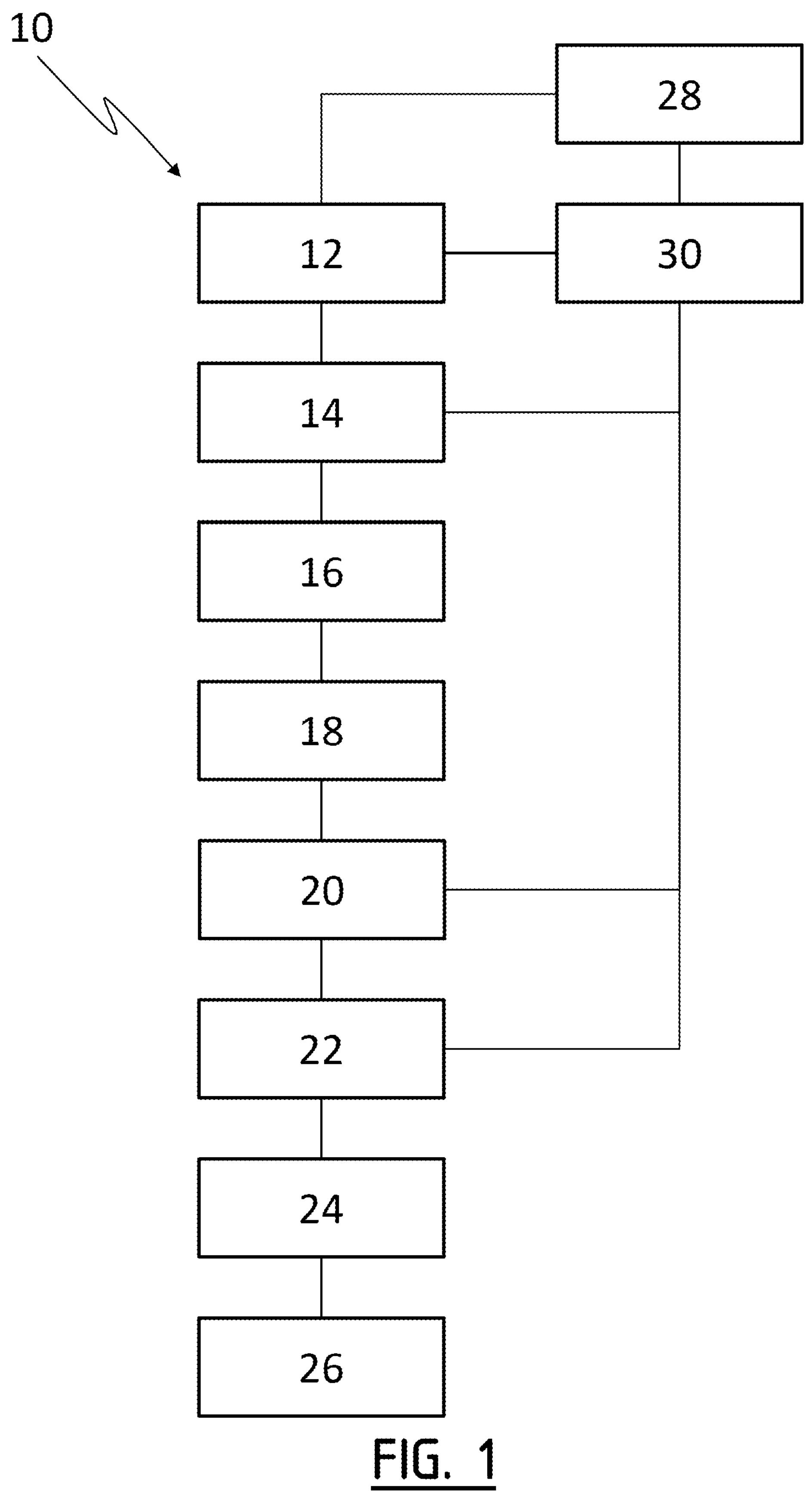
FIG. 1 is an exemplary system diagram of a vehicle according to an example.

A vehicle 10 according to an example is shown in the exemplary diagram of FIG. 1. The vehicle 10 is for example a heavy-duty vehicle, preferably a truck.

The vehicle 10 comprises an internal combustion engine 12, and a drivetrain comprising, in this order, an upstream clutch 14, a gearbox 16, a transmission shaft 18, a kinetic energy recovery system (KERS) 20, a downstream clutch 22, a wheel propulsion shaft 24 and wheels 26. The vehicle 10 also comprises a starter 28 and a control unit 30.

The internal combustion engine 12 provides mechanical energy to propel the vehicle 10, and is hereinafter referred to as the engine.

The gearbox 16 allows the vehicle to have multiple speed configurations and can be connected or disconnected from the engine 12 through the upstream clutch 14. More precisely, the upstream clutch 14 is operable between an uncoupling configuration, in which the transmission shaft 18 is not connected to the engine 12, and a coupling configuration, in which the transmission shaft is connected to the internal combustion engine.

The transmission shaft 18 is connected to an output of the gearbox 16 and to the wheel propulsion shaft 24. Furthermore, the transmission shaft 18 can be connected or disconnected from the propulsion shaft through the downstream clutch 22. More precisely, the downstream clutch 22 is operable between an uncoupling configuration, in which the transmission shaft 18 is not connected to the propulsion shaft 24, and a coupling configuration, in which the transmission shaft is connected to the propulsion shaft. The propulsion shaft 24 is connected to the wheels 26 to propel the wheels, preferably through a differential.

In normal operation of the vehicle 10, the upstream and downstream clutches 14, 22 are in their coupling configuration, so that the wheel propulsion shaft 24 and the wheels 26 are driven by the engine 12.

The kinetic energy recovery system (KERS) 20 is hereinafter referred to by its abbreviation KERS. The KERS is connected to the transmission shaft 18, and therefore, to the engine 12 and to the wheel propulsion shaft 24.

In normal operation of the vehicle 10, when the vehicle 10 is decelerating, the KERS 20 is able to recover and store kinetic energy of the vehicle, for example through regenerative braking.

In normal operation of the vehicle 10, when the vehicle 10 is accelerating, the KERS is able to restore the stored energy and use it to propel the transmission shaft 18, and thus to propel the wheel propulsion shaft 24 and the engine 12.

The KERS stores the kinetic energy of the vehicle 10 as mechanical energy. In the example, the KERS comprises a flywheel, and the kinetic energy of the vehicle is stored as rotational energy of the flywheel: the faster the flywheel rotates, the more energy is stored.

The starter 28, also referred to as a “cranking motor” or “starter motor”, is used to rotate, that is to crank, the engine 12 so as to initiate the engine’s operation. In other words, the starter is used to start the engine. Therefore, the starter is connected to the engine 12. In the example, the starter is an electric starter, that is, is powered by electrical energy, which is for example provided by a battery of the vehicle 10.

Figure 2:
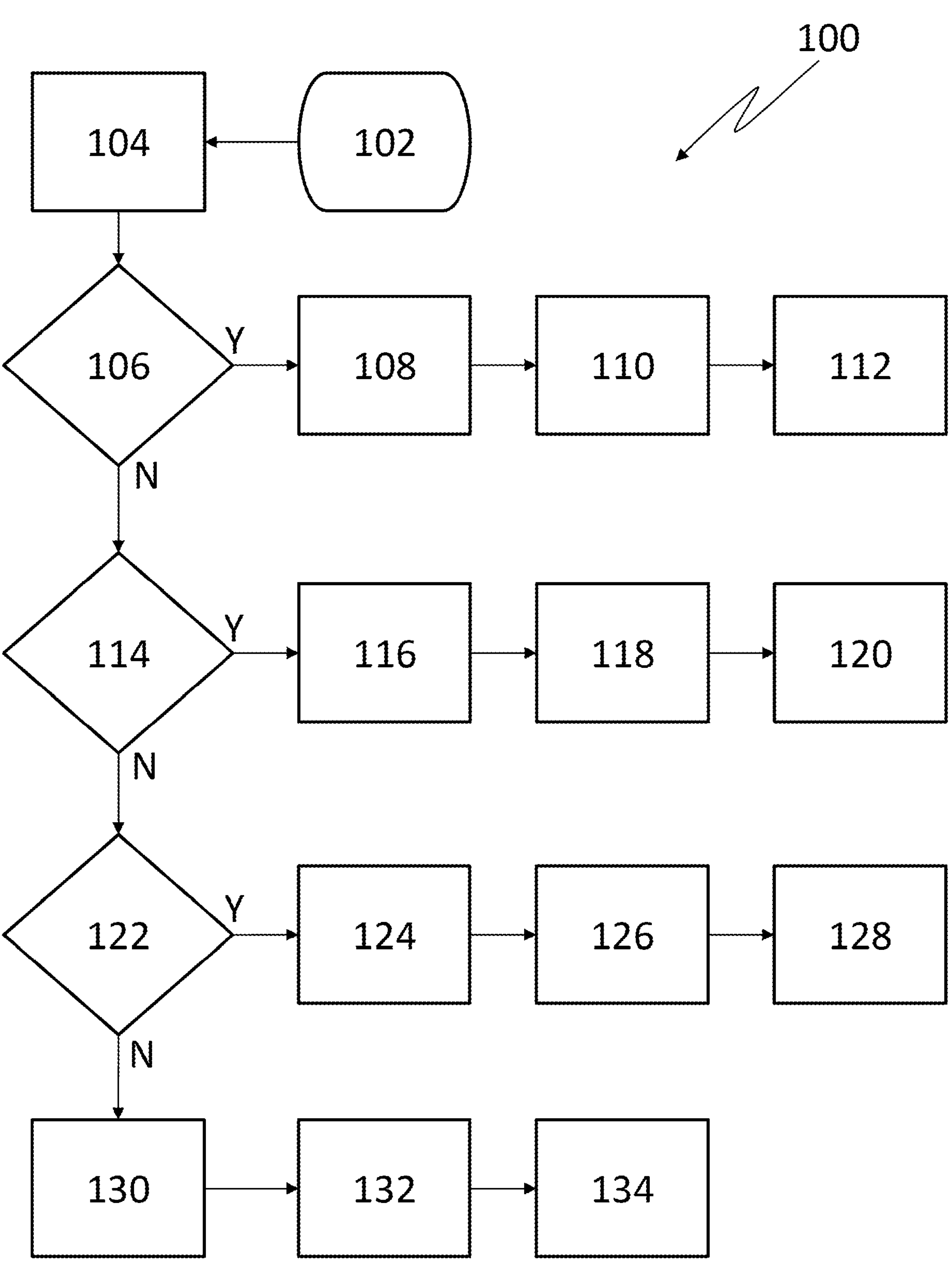
FIG. 2 is an exemplary flowchart of a method according to an example for operating the vehicle of FIG. 1.

With reference to FIG. 2, a method 100 for operating the vehicle 10 is now described.

The method 100 is advantageously performed by the control unit 30.

The control unit 30 is preferably a control unit dedicated to the performing of the method 100, which is also interacting with a main control unit of the vehicle 10. Alternatively, the control unit is the main control unit of the vehicle 10, which is performing other tasks during the operation of the vehicle.

The method 100 starts when the vehicle 10 is operated, that is, when the vehicle is not stationary.

In a recovering step 102 of the method 100, which is performed when the vehicle is not stationary, the KERS 20 recovers and stores kinetic energy of the vehicle.

Then, after the vehicle 10 comes to a stop, the method comprises a measuring step 104. In other words, the measured step is performed when the vehicle is stationary. During the measuring step, the energy level stored in the KERS is measured.

The energy level stored in the KERS is, for example, calculated by measuring the rotational speed of the flywheel and based on the known moment of inertia of the flywheel.

Then, the method 100 comprises a first comparing step 106, during which the measured energy level stored in the kinetic energy recovery system is compared with a predetermined high threshold value.

If the energy level stored in the KERS is above the predetermined high threshold value, the method 100 comprises an engine stop step 108, consisting of stopping the engine 12. After this step, the vehicle 10 is stationary and the engine is not running, which is particularly advantageous to reduce the fuel consumption of the vehicle, for example when the vehicle is stationary for a long period, such as at a red light.

Then, when the vehicle 10 start is required, the method 100 comprises a propelling step 110, during which the wheel propulsion shaft 24 is exclusively propelled by the KERS 20. In other words, during this step, the engine 12 is not propelling the wheel propulsion shaft.

Preferably, before or during this propelling step 110, the upstream clutch 14 is operated in its uncoupling configuration, so that no energy provided by the KERS 20 is lost by friction in the engine.

Then, in a step 112, the engine 12 is cranked, and, if applicable, the upstream clutch 14 is operated in its coupling configuration, so that the wheel propulsion shaft 24 is propelled by the engine. When the engine 12 is cranked, the KERS 20 may have exhausted its stored kinetic energy, or may still be storing kinetic energy.

During the step 112, the engine 12 is preferably cranked with the KERS: by operating the upstream clutch in its coupling configuration while the engine is not running, the KERS cranks the motor by forcing its motion, through the transmission shaft 18 and the gearbox 16. Alternatively, the engine is cranked with the starter 28.

Preferably, the engine 12 is cranked only when the speed of the vehicle 10 is above a predetermined speed threshold, preferably above 5 km/h, more preferably above 15 km/h, most preferably above 30 km/h. In this way, the starting and acceleration of the vehicle up to this predetermined speed threshold is carried out solely with the KERS. This is particularly advantageous to reduce noise and pollutant emissions of the vehicle, as most of the vehicle’s noise and pollutant emissions, particularly for a heavy-duty vehicle, would otherwise be emitted by the engine during the starting and acceleration of the vehicle.

Preferably, after the engine 12 has been cranked, the wheel propulsion shaft is propelled exclusively by the engine, allowing to conserve kinetic energy stored in the KERS for a later starting phase of the vehicle.

If the energy level stored in the KERS is found to be below the predetermined high threshold value during the first comparing step 106, the method 100 comprises a second comparing step 114, during which the energy level stored in the kinetic energy recovery system is compared to a predetermined medium threshold value. This second comparing step 114 is also performed when the vehicle 10 is stationary.

If the energy level stored in the KERS is above the predetermined medium threshold value, the method 100 comprises an engine stop step 116, consisting of stopping the engine 12. After this step, the vehicle 10 is stationary and the engine is not running, which is particularly advantageous to reduce the fuel consumption of the vehicle, for example when the vehicle is stationary for a long period, such as at a red light.

Then, when the vehicle 10 start is required, the method 100 comprises a cranking step 118, during which the engine 12 is cranked, and, if applicable, the upstream clutch 14 is operated in its coupling configuration.

The engine 12 is preferably cranked with the KERS: by operating the upstream clutch in its coupling configuration while the engine is not running, the KERS cranks the motor by forcing its motion, through the transmission shaft 18 and the gearbox 16. Alternatively, the engine is cranked with the starter 28.

Then, the method 100 comprises a propulsion step 120, during which the wheel propulsion shaft 24 is propelled simultaneously by the KERS 20 and by the engine 12. In other words, during this step, the KERS helps the engine to propel the wheel propulsion shaft.

This helps reducing the noise and pollutant emissions of the vehicle 10, since the load on the engine 12 is reduced.

If the energy level stored in the KERS is found to be below the predetermined medium threshold value during the second comparing step 114, the method 100 comprises a third comparing step 122, during which the energy level stored in the kinetic energy recovery system is compared to a predetermined low threshold value. This third comparing step 122 is also performed when the vehicle 10 is stationary.

If the energy level stored in the KERS is above the predetermined low threshold value, the method 100 comprises an engine stop step 124, consisting of stopping the engine 12. After this step, the vehicle 10 is stationary and the engine is not running, which is particularly advantageous to reduce the fuel consumption of the vehicle, for example when the vehicle is stationary for a long period, such as at a red light.

Then, when the vehicle 10 start is required, the method 100 comprises a cranking step 126, during which the engine 12 is cranked, and, if applicable, the upstream clutch 14 is operated in its coupling configuration. The engine 12 is cranked with the KERS: by operating the upstream clutch in its coupling configuration while the engine is not running, the KERS cranks the motor by forcing its motion, through the transmission shaft 18 and the gearbox 16. During this step, the downstream clutch 22 is in its uncoupling configuration, so that the KERS does not propel the wheel propulsion shaft 24, and therefore does not propel the vehicle 10.

Then, the method 100 comprises a propulsion step 128, during which the wheel propulsion shaft 24 is propelled exclusively by the engine 12. In other words, during this step, the KERS is not used to propel the wheel propulsion shaft. Thanks to the steps 124 to 128, the engine 12 can be stopped when the vehicle is stationary and cranked without needing the starter 28, allowing to reduce the wear of the starter and to reuse kinetic energy stored in the KERS.

If the energy level stored in the KERS is found to be below the predetermined low threshold value during the third comparing step 122, the method 100 comprises an engine stop step 130 consisting of stopping the engine 12. After this step, the vehicle 10 is stationary and the engine is not running, which is particularly advantageous to reduce the fuel consumption of the vehicle, for example when the vehicle is stationary for a long period, such as at a red light.

Then, when the vehicle 10 start is required, the method 100 comprises a cranking step 132, during which the engine 12 is cranked, and, if applicable, the upstream clutch 14 is operated in its coupling configuration. The engine 12 is cranked with the starter 28.

Then, the method 100 comprises a propulsion step 134, during which the wheel propulsion shaft 24 is propelled exclusively by the engine 12. In other words, during this step, the KERS is not used to propel the wheel propulsion shaft. Thanks to the steps 124 to 128, the engine 12 can be stopped when the vehicle is stationary even when the KERS is depleted of stored energy.

Based on the above, it is understood that the method 100 describes four ways, or use case, to use the kinetic energy stored in the KERS 20: in a first use case, with steps 108 to 112, the vehicle 10 is propelled only with the KERS until a predetermined speed is reached. This first use case is applied in particular when the level of stored energy in the KERS is high. In a second use case, with steps 116 to 120, the vehicle 10 is propelled simultaneously with the KERS and the engine 12. This use case is applied in particular when the KERS stores a medium level of energy, insufficient to propel the vehicle only with the KERS. In a third use case, with steps 124 to 128, the engine 12 is cranked with the KERS and the vehicle is propelled only with the engine. This use case is applied in particular when the KERS stores a low level of energy, only sufficient to crank the engine. In a fourth use case, with steps 130 to 134, the engine is cranked with the starter and the vehicle is only propelled with the engine. This use case is applied in particular when the KERS is depleted of stored energy.

Thanks to the method 100 described here above, the efficiency of the vehicle 10 is improved. More precisely, its fuel consumption and pollutant emission are reduced, as well as its noise emission, especially when frequent stop and start of the vehicle are required, as in urban environments. Indeed, thanks to the method, the vehicle can be regularly propelled exclusively with the KERS after a stop, or simultaneously with the KERS and with the engine. Thus, the engine is less used to propel the vehicle, and its emissions of noise and pollutants are reduced. Furthermore, since the KERS reuses recovered kinetic energy to propel the vehicle 10, the fuel consumption of the vehicle is decreased.

In addition, since the started 28 is only used when the KERS is depleted of stored energy, that is, in the fourth use case, the wear of the starter is increased, reducing the risk of failure during the lifespan of the vehicle.

Since the method 100 provides multiple uses of the kinetic energy stored in the KERS, this energy can be used with great efficiency, by choosing the most adequate use case of the method 100, depending of the level of stored energy.

In certain examples, it has been found that the method 100 described here above allows for a truck operated in a city to be fully propelled by the KERS for a third of the distance travelled. In particular, in a city with restricted maximum speed, the vehicle 10 can be propelled exclusively by the KERS between two successive red lights for about a third of the distance travelled. In other words, in certain use case, the engine 12 is not cranked between two successive stop of the vehicle 10, allowing greatly reducing the noise and pollutants emissions of the vehicle.

According to another example, during the step 130, that is, when the level of energy stored in the KERS 20 is below the low predetermined threshold, the engine 12 is not stopped. Thus, according to this example, the method 100 does not comprises the cranking step 132 between the step 130 and the propelling step 134.

According to another example, the method 100 does not comprise the comparing step 114. Consequently, the method does not comprises the step 116 to 120. In this example, if the energy level stored in the KERS is found to be below the predetermined high threshold value during the first comparing step 106, then the energy level stored in the KERS is compared to the predetermined low threshold value.

According to another example, the method 100 does not comprise the comparing step 122. Consequently, if the energy level stored in the KERS is found to be below the predetermined medium threshold value during the second comparing step 114, then the method continues either with the steps 124 to 128 or with the steps 130 to 134.

According to another example, during the step 112, the criteria used to determine when the engine 12 is cranked is not a predetermined speed threshold, but is another criteria, such as a level of stored energy in the KERS, or a distance travelled by the vehicle 10 since its start, or a duration since the vehicle's start.

According to another example, the vehicle 10 does not comprise the upstream clutch 14. In this example, during the propelling step 110, the engine 12 is driven by the KERS 20.

According to another example, the vehicle 10 does not comprise the gearbox 16.

According to another example, the vehicle 10 does not comprise the downstream clutch 22. In this example, the method 100 does not comprises the steps 124 to 128, since the KERS 20 cannot be used to crank the engine 12 without propelling the wheel propulsion shaft 24.

According to another example, the vehicle 10 does not comprise the starter 28. In this example, the method 100 does not comprises the steps 130 to 134, that is, the engine 12 is not stopped when the energy level stored in the KERS is below the predetermined low threshold value.

According to another example, the KERS 20 is not a flywheel, but another kind of system adapted to store the kinetic energy of the vehicle 10 as mechanical energy, such as, for example, a system using compressed air or gases, or a hydraulic system.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A method for operating a vehicle, the vehicle comprising:

an internal combustion engine, a wheel propulsion shaft, configured to be driven by the internal combustion engine, wheels, configured to be driven by the wheel propulsion shaft, and a kinetic energy recovery system, connected to the internal combustion engine and to the wheel propulsion shaft and configured to:

recover and store kinetic energy of the vehicle as mechanical energy, and restore the stored energy by propelling the wheel propulsion shaft and/or by cranking the internal combustion engine, wherein the method comprises when the vehicle operates:

when the vehicle is not stationary, recovering and storing kinetic energy of the vehicle in the kinetic energy recovery system as mechanical energy, when the vehicle is stationary, measuring an energy level stored in the kinetic energy recovery system and comparing the measured energy level stored in the kinetic energy recovery system to a predetermined high threshold value, so that the method comprises, if the energy level stored in the kinetic energy recovery system is above the predetermined high threshold value:

stopping the internal combustion engine, then when the vehicle start is required, propelling the wheel propulsion shaft exclusively by the kinetic energy recovery system.

2. The method of claim 1, wherein after propelling the wheel propulsion shaft exclusively with the kinetic energy recovery system, the method comprises propelling the wheel propulsion shaft with the internal combustion engine when the speed of the vehicle is above a predetermined speed threshold.

3. The method of claim 1, wherein the vehicle further comprises an upstream clutch operable between an uncoupling configuration, in which the kinetic energy recovery system is not connected to the internal combustion engine, and a coupling configuration, in which the kinetic energy recovery system is connected to the internal combustion engine, and wherein, before propelling the wheel propulsion shaft exclusively with the kinetic energy recovery system, the method further comprises operating the upstream clutch in the uncoupling configuration.

4. The method of claim 1, wherein the method further comprises, if the energy level stored in the kinetic energy recovery system is below the predetermined high threshold value:

when the vehicle is stationary, comparing the measured energy level stored in the kinetic energy recovery system to a predetermined medium threshold value, the predetermined medium threshold value being lower than the predetermined high threshold value, so that the method comprises, if the energy level stored in the kinetic energy recovery system is above the predetermined medium threshold value:

stopping the internal combustion engine, then when the vehicle start is required, cranking the internal combustion engine, and propelling the wheel propulsion shaft with the kinetic energy recovery system and with the internal combustion engine.

5. The method of claim 4, wherein when the energy level stored in the kinetic energy recovery system is above the predetermined medium threshold value and below the predetermined high threshold value and when the vehicle start is required, the internal combustion engine is cranked by the kinetic energy recovery system.

6. The method of claim 1, wherein the vehicle further comprises a downstream clutch operable between an uncoupling configuration, in which the kinetic energy recovery system is not connected to the wheel propulsion shaft, and a coupling configuration, in which the kinetic energy recovery system is connected to the wheel propulsion shaft, and wherein the method further comprises, if the energy level stored in the kinetic energy recovery system is below the predetermined high threshold value:

when the vehicle is stationary, comparing the measured energy level stored in the kinetic energy recovery system to a predetermined low threshold value, the predetermined low threshold value being lower than the predetermined high threshold value, so that the method comprises, if the energy level stored in the kinetic energy recovery system is above the predetermined low threshold value:

stopping the internal combustion engine and operating the downstream clutch in the uncoupling configuration, then when the vehicle start is required, cranking the internal combustion engine with the kinetic energy recovery system, operating the downstream clutch in the coupling configuration and propelling the wheel propulsion shaft with the internal combustion engine.

7. The method of claim 1, wherein the method further comprises, if the energy level stored in the kinetic energy recovery system is below the predetermined high threshold value:

when the vehicle is stationary, keeping the internal combustion engine running, then when the vehicle start is required, propelling the wheel propulsion shaft with the internal combustion engine.

8. The method of claim 1, wherein the vehicle further comprises a starter, configured to crank the internal combustion engine, and wherein the method further comprises, if the energy level stored in the kinetic energy recovery system is below the predetermined high threshold value:

when the vehicle is stationary, stopping the internal combustion engine, then when the vehicle start is required, cranking the internal combustion engine with the starter and propelling the wheel propulsion shaft with the internal combustion engine.

9. A control unit configured to perform the method of claim 1.

10. A vehicle comprising:

an internal combustion engine, a wheel propulsion shaft, configured to be driven by the internal combustion engine, wheels, configured to be driven by the wheel propulsion shaft, a kinetic energy recovery system, connected to the internal combustion engine and to the wheel propulsion shaft and configured to:

recover and store kinetic energy of the vehicle as mechanical energy, and restore the stored energy by propelling the wheel propulsion shaft and/or by cranking the internal combustion engine, a control unit, wherein the control unit is according to claim 9.

11. The vehicle of claim 10, further comprising an upstream clutch operable between an uncoupling configuration, in which the kinetic energy recovery system is not connected to the internal combustion engine, and a coupling configuration, in which the kinetic energy recovery system is connected to the internal combustion engine.

12. The vehicle of claim 10, further comprising a downstream clutch operable between an uncoupling configuration, in which the kinetic energy recovery system is not connected to the wheel propulsion shaft, and a coupling configuration, in which the kinetic energy recovery system is connected to the wheel propulsion shaft.

13. The vehicle of claim 10, wherein the vehicle further comprises a starter, configured to crank the internal combustion engine.

14. The vehicle of claim 10, wherein the kinetic energy recovery system comprises a flywheel.

15. The vehicle of claim 10, wherein the vehicle is a truck, a bus, or a construction equipment.

16. The method of claim 2, wherein the predetermined speed threshold is 5 km/h.

17. The method of claim 2, wherein the predetermined speed threshold is 15 km/h.

18. The method of claim 2, wherein the predetermined speed threshold is 30 km/h.

* * * * *